(No Model.)
F. A. RUGGLES.
CULTIVATOR.
No. 422,161. Patented Feb. 25, 1890.
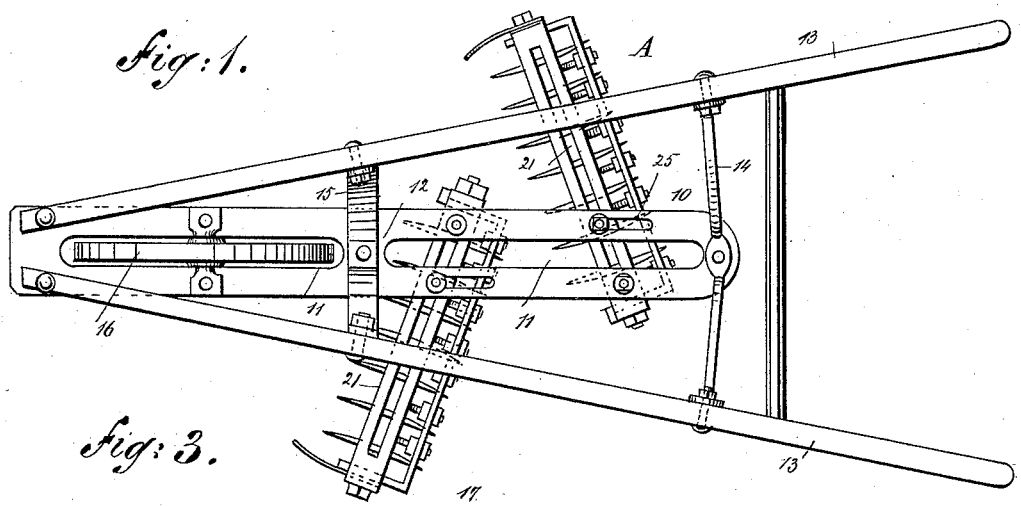
Fig. 1.
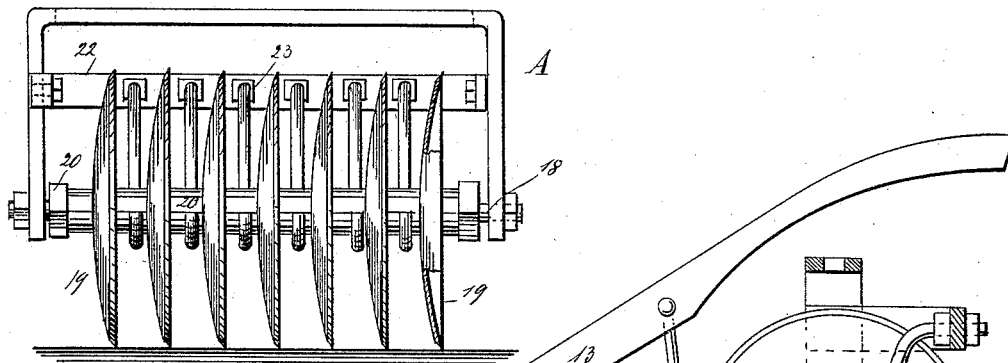
Fig. 3.
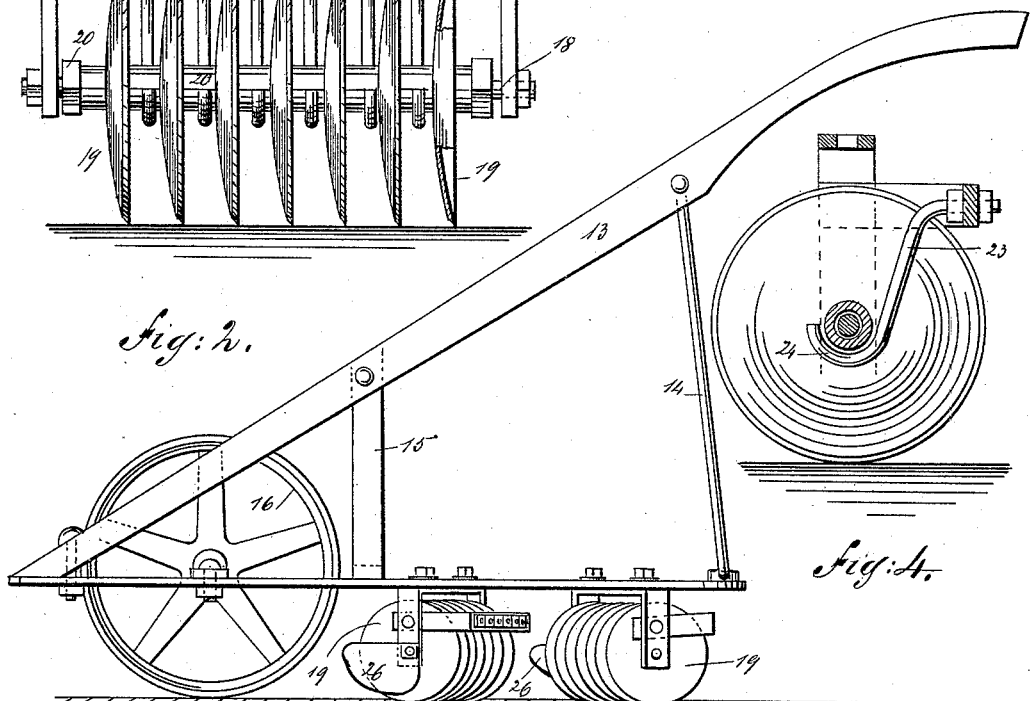
Fig. 2.
Fig. 4.
WITNESSES:
INVENTOR:
F. A. Ruggles
BY Munn
ATTORNEYS.

UNITED STATES PATENT OFFICE.

FRANK A. RUGGLES, OF THREE RIVERS, MASSACHUSETTS.

CULTIVATOR.

SPECIFICATION forming part of Letters Patent No. 422,161, dated February 25, 1890.

Application filed July 5, 1889. Serial No. 316,511. (No model.)

*To all whom it may concern:*

Be it known that I, FRANK A. RUGGLES, of Three Rivers, in the county of Hampden and State of Massachusetts, have invented a new and useful Improvement in Cultivators, of which the following is a full, clear, and exact description.

My invention relates to an improvement in cultivators, and has for its object to provide a hand implement especially adapted for garden use, and which may be used as a weed-cutter, or as a weed-cutter and cultivator combined.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1 is a plain view of the implement. Fig. 2 is a side elevation. Fig. 3 is a front view of one of the cutter-arms attached, and Fig. 4 is a central vertical section through one of said arms between two opposed disk cutters.

The frame of the implement consists of a base 10, which base is preferably provided with longitudinal slots 11, one extending from a point at or near the forward end to a point approximating the center, and the other extending from a point at or near the rear end to within a short distance of the rear wall of the forward slot, whereby a bridge 12 is obtained.

The handles 13 are rigidly secured at their forward and lower ends to the base-plate 10—one at each side of the said plate at the front—and the said handles are further connected with the base-plate by essentially V-shaped brace-bars or straps 14 and 15, which brace-bars or straps are secured to the inner faces of the handles at one end, the forward strap or brace-bar being attached also to the bridge 12 of the base-plate, and the rear strap or brace-bar to the rear end of said base-plate, as best illustrated in Fig. 1.

In the forward slot of the base 10 a wheel 16 is held to revolve, the shaft upon which the wheel is journaled being rigidly secured to the base. In connection with the base I employ two cutting-arms A, each of which arms is identical in construction, and consists of an essentially U-shaped frame 17, in the extremities of the members of which a shaft 18 is journaled, and upon the said shaft a series of disk cutters 19 are secured, having one convex and one concave face.

The cutters 19 are held a suitable distance apart by means of sleeves 20, mounted upon the said shaft 18, which sleeves intervene the opposed faces of the several cutters and the outer faces of the end cutters and a suitable lock-nut 20, fast upon the shaft 18, near the frame in which said shaft is jouraled, as illustrated in Fig. 3.

The upper or horizontal member of the frame 17 is provided with a longitudinal slot 21, and to the perpendicular U-shaped frame 17 a second horizontal U-shaped frame 22 is rigidly attached at the front, and in said frame 22 one end of a series of cleaning-bars 23 is secured, which bars are curved downward between the several disk cutters 19, and curved upward at their lower extremities around the sleeves 20, as illustrated at 24 in Fig. 4.

One cutter-arm is pivoted at or near one of its ends to the left-hand side of the base, the other end of which arm extends beyond the right-hand side of the base at an angle thereto. The other cutting-arm is pivoted at one of its ends in advance of the arm above mentioned to the right-hand side of the base and extends at an angle thereto beyond the left-hand edge thereof. The arms are adjusted to any desired angle with reference to the base by forming in the said base slots 25 to the right and left of the rear longitudinal slot 11, and passing a set-screw or equivalent device through said slots into and through the slots 21 in the vertical frame of the cutter-bars.

When the device is to be used as a cultivator and weeder, the cutter-bars are placed each at the angle illustrated in Fig. 1, which is less than a right angle, and when so placed the disk cutters in the rear will cross the track of the disk cutters attached to the forward portion of the base, thus producing what is known as a "cross-hatch cut," effectually destroying any weeds in the path of the implement, and when the cutters are set at the angle illustrated the resistance of one set of cutters is counterbalanced by the resistance of the other set, whereby the operator has but little difficulty in guiding the implement in a straight line. It will also be observed that when the cutters are located as shown they will not only sever the weeds in their path, but they will also tend to throw the loosened soil in the direction of the roots of the plants.

By changing the angle of the cutters they may be made to sever the weeds, and also to remove the earth from the bulbs of such plants as onions, beets, &c., wherein it is required to expose the bulb to an extent in order to promote its growth, and in order that when the implement is used for this purpose and the cutters are carried close to the plants that the latter may not be injured I secure to each lower extremity of the main frame 17 of the cutters a fender 26, as illustrated in Fig. 1; but ordinarily a fender is placed at but one end of the cutter-arms—that is, the outer end. It will be observed, further, that as the cutter-arms may be adjusted to any desired angle upon the base 10 the implement may be readily manipulated by the operator as occasion may demand.

Instead of the disk illustrated, what is known as the "cut-away disk cutter" may be employed without departing from the spirit of the invention.

Having thus described my invention, I claim as new and desire to secure by Letters Patent—

1. In a cultivator, the combination, with a slotted frame, of slotted arms secured to opposite sides of the frame by bolts passing through the slots of the arms and frame, and a series of cutting-disks mounted in the said arms, substantially as described.

2. In a cultivator, the combination, with a U-shaped frame, of a shaft journaled in the vertical members of the frame, a series of spaced disk cutters secured to the shaft, a second U-shaped frame having its ends secured to the vertical members of the first-named frame, and a series of cleaning-bars secured to the second U-shaped frame and having their ends curved upward between the disk cutters, substantially as described.

3. A cultivator consisting of the slotted base 10, the wheel 16, journaled in the base, V-shaped brace-bars 14 and 15, secured to the base, the handles 13, secured to the base and to the said brace-bars, the slotted U-shaped frame 17, secured to the opposite sides of the base, the disk cutters 19, journaled in the frame, the U-shaped frame 22, secured to the frame 17, and the cleaning-bars 23, secured to the frame 22, substantially as herein shown and described.

FRANK A. RUGGLES.

Witnesses:
GEORGE ROBINSON,
A. PINNEY.